US010679678B2

(12) United States Patent
Ekambaram et al.

(10) Patent No.: US 10,679,678 B2
(45) **Date of Patent: *Jun. 9, 2020**

(54) LOOK-AHEAD FOR VIDEO SEGMENTS

(71) Applicant: International Business Machines Corporation, Armonk, NY (US)

(72) Inventors: Vijay Ekambaram, Chennai (IN); Ramasuri Narayanam, Guntur (IN); Nitendra Rajput, Gurgaon (IN); Yedendra B. Shrinivasan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,955

(22) Filed: Jul. 3, 2019

(65) Prior Publication Data

US 2019/0325916 A1 Oct. 24, 2019

Related U.S. Application Data

(63) Continuation of application No. 15/482,871, filed on Apr. 10, 2017, now Pat. No. 10,395,693.

(51) Int. Cl.

*G11B 27/34* (2006.01)
*G11B 27/24* (2006.01)

(Continued)

(52) U.S. Cl.

CPC ............ *G11B 27/34* (2013.01); *G11B 27/007* (2013.01); *G11B 27/24* (2013.01); *G10L 15/26* (2013.01)

(58) Field of Classification Search

CPC ..... G10L 15/265; G11B 27/007; G11B 27/24; G11B 27/34

(Continued)

(56) References Cited

U.S. PATENT DOCUMENTS 7,080,392 B1 7/2006 Geshwind
7,523,138 B2 4/2009 Gruhl et al.

(Continued)

FOREIGN PATENT DOCUMENTS

WO 2014142758 9/2014
WO 2016007374 1/2016

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Thai Q Tran
*Assistant Examiner* — Stephen R Smith
(74) *Attorney, Agent, or Firm* — Law Office of Jim Boice

(57) ABSTRACT

A computer-implemented method overlays an alert over a pre-recorded video regarding an upcoming segment of the pre-recorded video. One or more processors receive a pre-recorded video that is directed to a main topic, and then partition the pre-recorded video into sub-topic segments, where each sub-topic segment is about a sub-topic of the main topic. The processor(s) identify previous entities' responses while previous entities viewed precursory sub-topic segments from the pre-recorded video, where the precursory sub-topic segments were presented before an upcoming sub-topic segment. The processor(s) receive a current entity's responses that occurred while a current entity viewed one or more of the precursory sub-topic segments from the pre-recorded video, then compare the current entity's responses to the previous entities' responses. In response to the responses matching, the processor(s) overlay an alert over the pre-recorded video advising the current entity that the upcoming sub-topic segment will be difficult to understand.

20 Claims, 8 Drawing Sheets

(51) Int. Cl.
*G11B 27/00* (2006.01)
*G10L 15/26* (2006.01)

(58) Field of Classification Search
USPC ................ 386/240; 715/723; 725/10, 12, 34
See application file for complete search history.

(56) References Cited

U.S. PATENT DOCUMENTS

| | | | | |
|---|---|---|---|---|
| 8,151,182 | B2 | 4/2012 | Datar et al. | |
| 8,285,121 | B2 | 10/2012 | Kulas | |
| 8,886,011 | B2 | 11/2014 | Chou et al. | |
| 9,357,232 | B2 | 5/2016 | Sinha et al. | |
| 9,741,258 | B1 | 8/2017 | Chetlur et al. | |
| 10,043,062 | B2 | 8/2018 | Chetlur et al. | |
| 2009/0150919 | A1 | 6/2009 | Lee | |
| 2010/0070987 | A1 | 3/2010 | Amento | |
| 2010/0169906 | A1 | 7/2010 | Takahashi | |
| 2011/0301433 | A1 * | 12/2011 | Sadowsky | A61B 5/165 600/300 |
| 2012/0124122 | A1 * | 5/2012 | el Kaliouby | G06Q 10/101 709/202 |
| 2012/0183275 | A1 | 7/2012 | Spears | |
| 2012/0222058 | A1 * | 8/2012 | el Kaliouby | H04N 21/251 725/10 |
| 2013/0117375 | A1 | 5/2013 | Bist | |
| 2013/0268954 | A1 | 10/2013 | Hulten | |
| 2013/0300759 | A1 | 11/2013 | White | |
| 2014/0237495 | A1 | 8/2014 | Jang | |
| 2014/0323817 | A1 * | 10/2014 | el Kaliouby | A61B 5/165 600/300 |
| 2015/0067708 | A1 | 3/2015 | Jensen | |
| 2015/0110464 | A1 | 4/2015 | Jackson | |
| 2015/0181291 | A1 | 6/2015 | Wheatley | |
| 2015/0229975 | A1 | 8/2015 | Shaw | |
| 2015/0229977 | A1 | 8/2015 | Kanigsberg | |
| 2015/0293675 | A1 | 10/2015 | Bloch | |
| 2015/0347903 | A1 * | 12/2015 | Saxena | G06T 11/206 706/11 |
| 2016/0066042 | A1 | 3/2016 | Dimov | |
| 2016/0112729 | A1 | 4/2016 | Sayed | |
| 2016/0191995 | A1 * | 6/2016 | el Kaliouby | H04N 21/4223 725/12 |
| 2016/0379505 | A1 * | 12/2016 | el Kaliouby | G16H 20/70 434/236 |
| 2017/0032820 | A1 | 2/2017 | Davis, III | |
| 2017/0293356 | A1 * | 10/2017 | Khaderi | A61B 3/024 |
| 2017/0358035 | A1 * | 12/2017 | Benfield | H05K 999/00 |
| 2018/0018507 | A1 * | 1/2018 | Chetlur | G06K 9/00315 |
| 2018/0018891 | A1 * | 1/2018 | Chetlur | G09B 5/12 |
| 2018/0024626 | A1 | 1/2018 | Sanger | |
| 2018/0270283 | A1 * | 9/2018 | Bostick | G06Q 10/10 |

OTHER PUBLICATIONS

Andrew Angus, “Top Tools to Simplify Video Analytics”. Swtich Video Productions, Inc., Jul. 10, 2012. Web. Nov. 29, 2016. <http://www.switchvideo.com/2012/07/10/TOP-TOOLS-TO-SIMPLIFY-VIDEO-ANALYTICS/>.

Prasanna Bharti, “Fishtree: Adaptive Learning Combined With Powerful Analytics”. Edtechreview (ETR), May 17, 2014. Web. Nov. 29, 2016. <http://edtechreview.in/NEWS/1207-FISHTREE-ADAPTIVE-LEARNING-COMBINED-WITH-POWERFUL-ANALYTICS>.

wirewax.com, Wirewax, 2016. Web. Nov. 29, 2016. <http://www.wirewax.com/>.

U.S. Appl. No. 15/482,871—Non-Final Office Action dated Nov. 29, 2018.

List of IBM Patents or Patent Applications Treated as Related, Jul. 3, 2019.

* cited by examiner

LOOK-AHEAD FOR VIDEO SEGMENTS

BACKGROUND

The present invention relates to the field of computers that are capable of utilizing pre-recorded videos. More particularly, the present invention relates to computers that are capable of utilizing pre-recorded videos based on previous responses to sub-segments of the pre-recorded videos.

SUMMARY

In a computer-implemented method embodiment of the present invention, one or more processors receive a pre-recorded video, where the pre-recorded video is directed to a main topic, and then partition the pre-recorded video into sub-topic segments, where each sub-topic segment is about a sub-topic of the main topic. The one or more processors identify previous entities' responses while previous entities viewed precursory sub-topic segments from the pre-recorded video, where the precursory sub-topic segments were presented before an upcoming sub-topic segment. The one or more processors receive a current entity's responses that occurred while a current entity viewed one or more of the precursory sub-topic segments from the pre-recorded video, then compare the current entity's responses to the previous entities' responses. In response to the current entity's responses matching the previous entities' responses, the one or more processors overlay an alert over the pre-recorded video advising the current entity that the upcoming sub-topic segment will be difficult to understand.

In one or more embodiments, the method(s) described herein are performed by an execution of a computer program product and/or a computer system.

DETAILED DESCRIPTION

Figure 1:
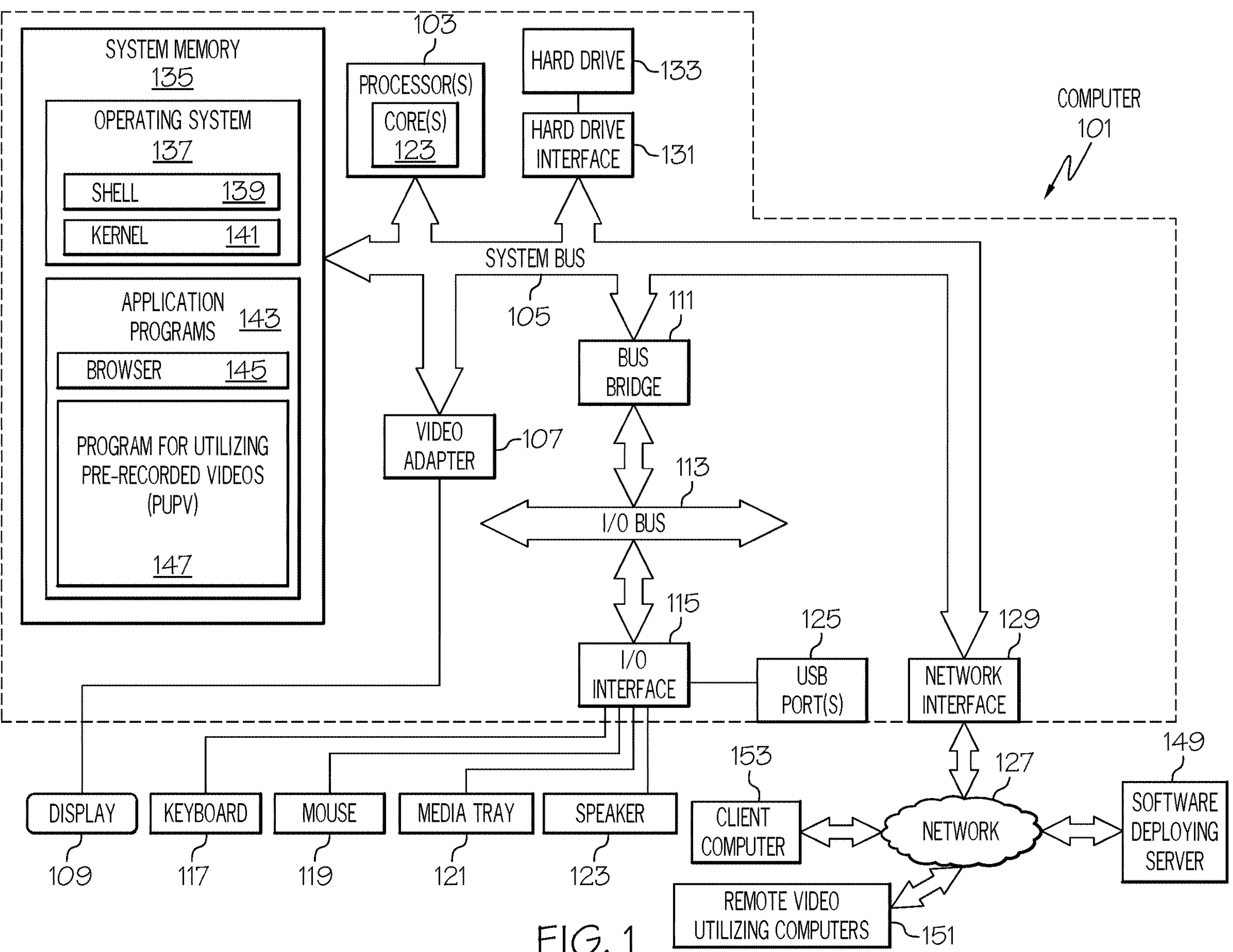
FIG. 1 depicts an exemplary system and network in accordance with one or more embodiments of the present invention.

With reference now to the figures, and in particular to FIG. 1, an exemplary system and network in accordance with one or more embodiments of the present invention is depicted. Some or all of the exemplary architecture, including both depicted hardware and software, shown for and within computer 101 can be utilized by: software deploying server 149 and/or remote video utilizing computers 151 and/or client computer 153 shown in FIG. 1.

With further reference to FIG. 1, exemplary computer 101 includes processor(s) 103, operably coupled to a system bus 105. Processor(s) 103 may embody or use one or more processor core(s) 123. A video adapter 107, which drives/supports a display 109, is also coupled to system bus 105. In one or more embodiments of the present invention, video adapter 107 detects (e.g., using inputs from keyboard 117 and/or mouse 119) that a user has paused, stopped, rewound, or otherwise interrupted the play of a video (not depicted) being shown on display 109.

System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports. In some embodiments, one or more of I/O devices such as keyboard 117 and display 109 are embodied as and/or locally attached to a device (not depicted), analogous to client computer 153 and/or a remote video utilizing computers 151.

As depicted, network interface 129 is also coupled to system bus 105. Network interface 129 can be a hardware network interface, such as a network interface card (NIC), etc. Computer 101 is able to communicate with a software deploying server 149 and/or remote video reviewing computers 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment of the present invention utilizing a network "cloud" environment will be discussed with reference to FIGS. 7 and 8.

Referring again to FIG. 1, a hard drive interface 131 is also coupled to system bus 105. Hard drive interface 131 interfaces with a hard drive 133. In one embodiment, hard drive 133 is a non-volatile memory storing and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a World Wide Web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in computer 101's system memory include a Program for Utilizing Pre-recorded Videos (PUPV) 147 in accordance with the present invention. In some embodiments, system memory 135 can be shared and/or application programs 143 distributed across one or more software deploying servers 149 or other systems. In the example depicted, PUPV 147 includes program instructions (software) adapted for implementing processes and/or functions in accordance with the present invention, such as (without limitation) those described with reference to FIGS. 2-6, and/or the cloud environment described with reference to FIGS. 7-8. In some embodiments, PUPV 147 is downloaded from software deploying server 149, (on-demand or "just-in-time") e.g., where the PUPV 147 software is not downloaded until needed for execution. In some embodiments of the present invention, software deploying server 149 can perform all (or many) of the functions associated with the present invention (including execution of PUPV 147), thus freeing computer 101 from having to use its internal computing resources.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Pre-recorded videos are available from the World Wide Web (WWW), such as on video sharing websites. Such video sharing websites allow viewers of the videos to post opinions, questions, and other comments related to the videos. For example, previous viewers of a video may post comments stating that the video was unclear about a particular subject that is addressed in the video. Such comments/questions may highlight various concepts of the video, or they may be related to test questions. The present invention utilizes a history of other viewers when utilizing a particular video, in order to tailor actions for a current viewer. Furthermore, actions taken for certain technological entities may be replicated upon further uses of the video.

Figure 2:
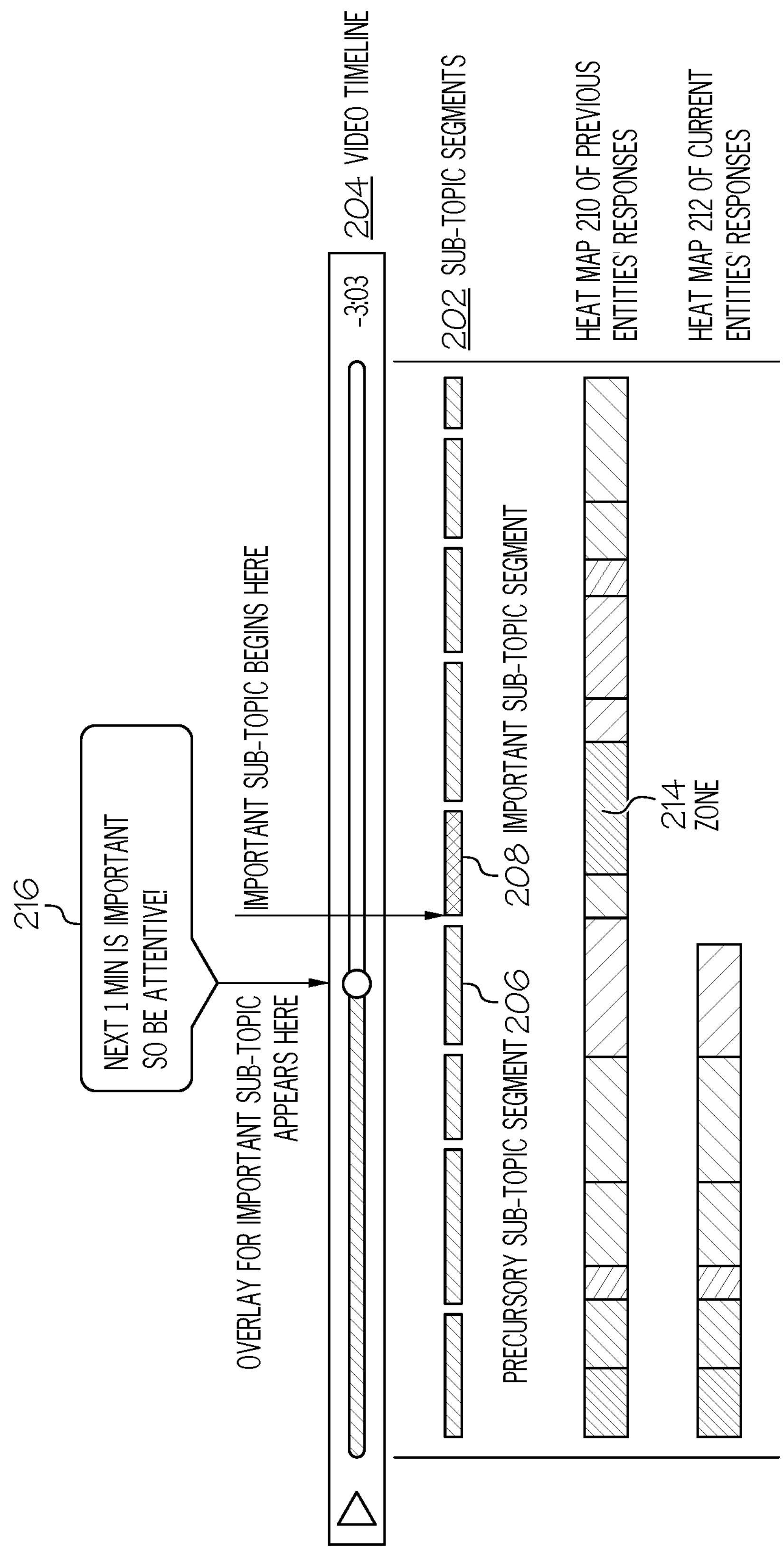
FIG. 2 illustrates an exemplary timeline in accordance with one or more embodiments of the present invention.

FIG. 2 illustrates an exemplary timeline in accordance with one or more embodiments of the present invention. With reference now to FIG. 2, assume that a pre-recorded video 200 is multimedia and is directed to a main topic, with multiple sub-topic segments 202 that are devoted to sub-topics of the main topic. Assume also that a video timeline 204 (which may or may not be displayed) shows a current location in the pre-recorded video 200.

When the pre-recorded video 200 reaches a precursory sub-topic segment 206 (which comes before an important sub-topic segment 208), the present invention will perform a particular action.

The "important" sub-topic segment 208 has been predetermined based on various predefined criteria.

For example, assume that video 200 is for a classroom lecture. Assume further that the information found in important sub-topic segment 208 is either likely to be on an exam, or is hard to understand.

By way of further example, a determination that the information in important sub-topic segment 208 is likely to be on an exam/quiz can be based on system retrieval of video captions (metadata) related to the important sub-topic segment 208 as well as other sub-topic segments, in order to determine the broad/main topic associated with the pre-recorded video 200. In some embodiments, the system generates a heat map of previous entities responses 210 to various sub-topic segments of the video 200. The heat map can also reflect data mining of past exams, which may reveal that the material presented in important sub-topic segment 208 is found in more than a pre-determined quantity of past exams. This leads to the "hot spots" shown in heat map 210, which may be tagged with time stamps from video timeline 204, indicating the density of possible exam/quiz materials by correlating the video captions with the past exam and/or other materials e.g., crowd-sourced online quiz contents (such as model quiz papers, question-answer forums, etc.). For example, zone 214 indicates the range in the video timeline 204 that contains relevant materials for a large number of quiz questions. Consequently, an "alert" sticker 216 may be inserted by the system into (e.g., overlaid on) the video 200 at a point along video timeline 204 that is associated with precursory sub-topic segment 206 (e.g., one minute before the start of the important sub-topic segment 208). This alert may be the result of known material that is likely to be on exams (thus generating an "exam" alert), or may be the result of material that is known to be hard to understand (e.g., based on previous users watching important sub-topic segment 208 multiple times, applying subtitles to important sub-topic segment 208, etc.).

Referring again to FIG. 2, knowing if or where to apply an alert sticker 216 may be based on activities of a current user as compared to previous users. For example, the heat map of previous entities' responses 210 reflects various actions that were taken by previous entities at various points in time of the video 200 (e.g., the video is paused, rewound, etc.). The heat map of current user responses 212 reflects actions that were taken by current entities, up to a point in time corresponding to important sub-topic segment 208. As depicted in this example, a current user of the video 200 has performed similar actions to prior users. As such, the system will assume that the action (e.g., overlaying sticker 216 over the video 200 when the precursory sub-topic segment 206 is reached) is also appropriate for the current user.

Figure 4:
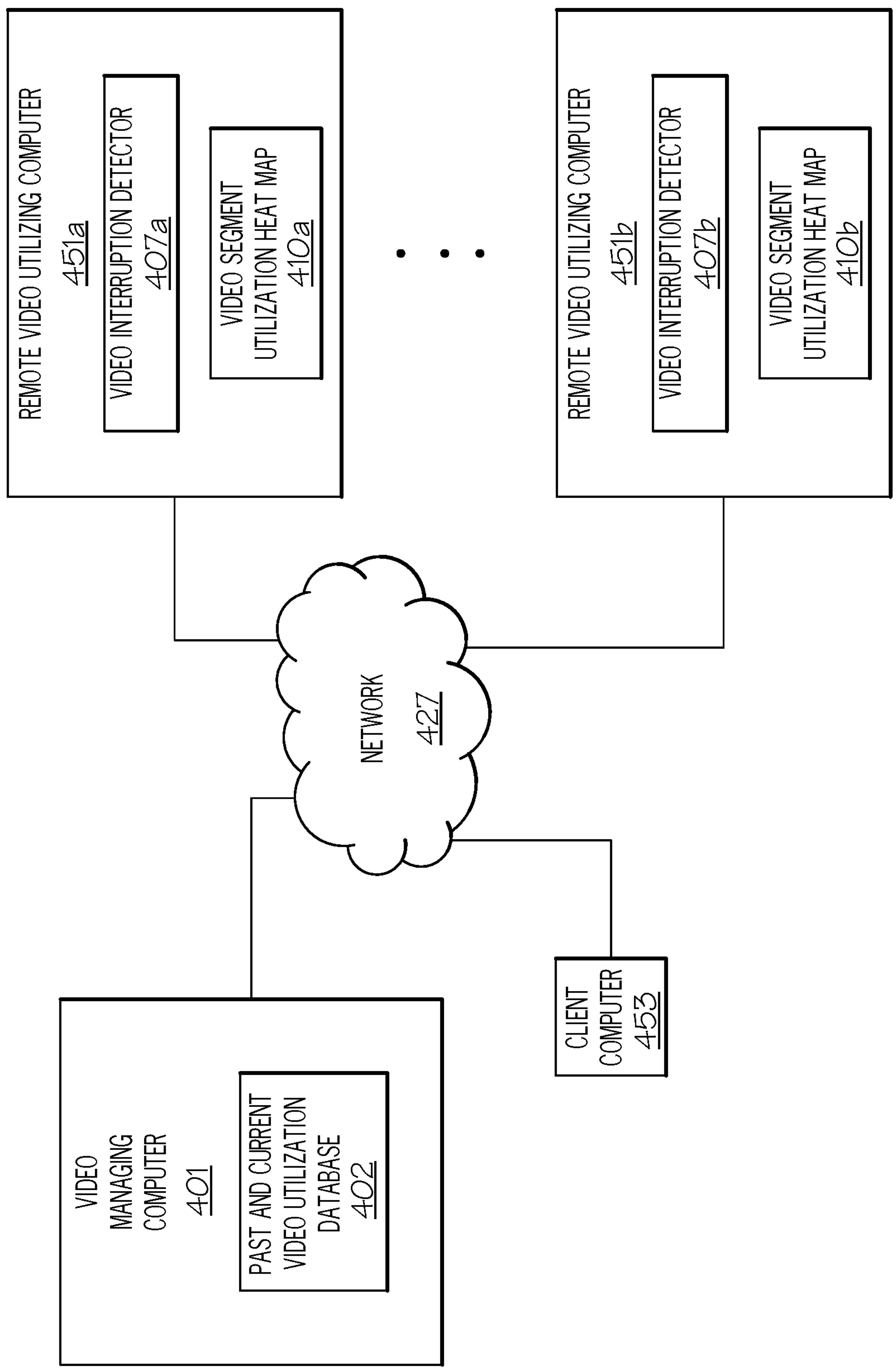
FIG. 4 illustrates an exemplary relationship between computers in accordance with one or more embodiments of the present invention.

FIG. 4 illustrates an exemplary relationship between computers in accordance with one or more embodiments of the present invention. As depicted, remote video utilizing computers 451*a*, 451*b* include respective sensors 407*a*, 407*b* to detect interruptions. Remote video utilizing computers 451*a*, 451*b* are operably coupled to network 427. In some embodiments, network 427 is analogous to network 127 shown in FIG. 1. In this example, with reference also to FIG. 2, an interruption can correspond to an alert sticker 216 that is indicative of difficult passages in the video 200. In other words, the alert sticker 216 may be overlaid at a particular point of the video 200, not because the material will be on the exam (although it may be), but rather based on a determined difficulty of understanding the upcoming material that will be presented in the important sub-topic segment 208.

For example, assume that multiple entities have viewed or otherwise utilized the video 200 in the past on remote video utilizing computers 451*a*-451*b* (where "b" is an integer). Assume further that video interruption detectors 407*a*-407*b* (e.g., part of video adapter 107 shown in FIG. 1) detect when previous viewers/users of the video 200 have paused, rewound, modified, etc. a particular passage in the video 200 (e.g., at important sub-topic segment 208). This information may be used to generate the video segment utilization heat maps 410*a*-410*b* (analogous to heat map 210 shown in FIG. 2).

Referring again to FIG. 4, a video managing computer 401 and client computer 453 are also operably coupled to network 427. In this example, various computers e.g., 401, 453, 451*a* and 451*b* can communicate via network 427. Video managing computer 401 has a past and current video utilization database 402.

In some embodiments, current video utilization database 402 includes the information found in heat map 210 and heat map 212 shown in FIG. 2. In some embodiments, video managing computer 401 is analogous to computer 101 shown in FIG. 1.

While the present invention has been described thus far as being related to overlaying alert tags on a video, some embodiments (an example of which will be discussed with reference to FIG. 5) use information associated with heat map 210 and heat map 212 to manipulate, modify, and/or otherwise control physical devices.

Figure 5:
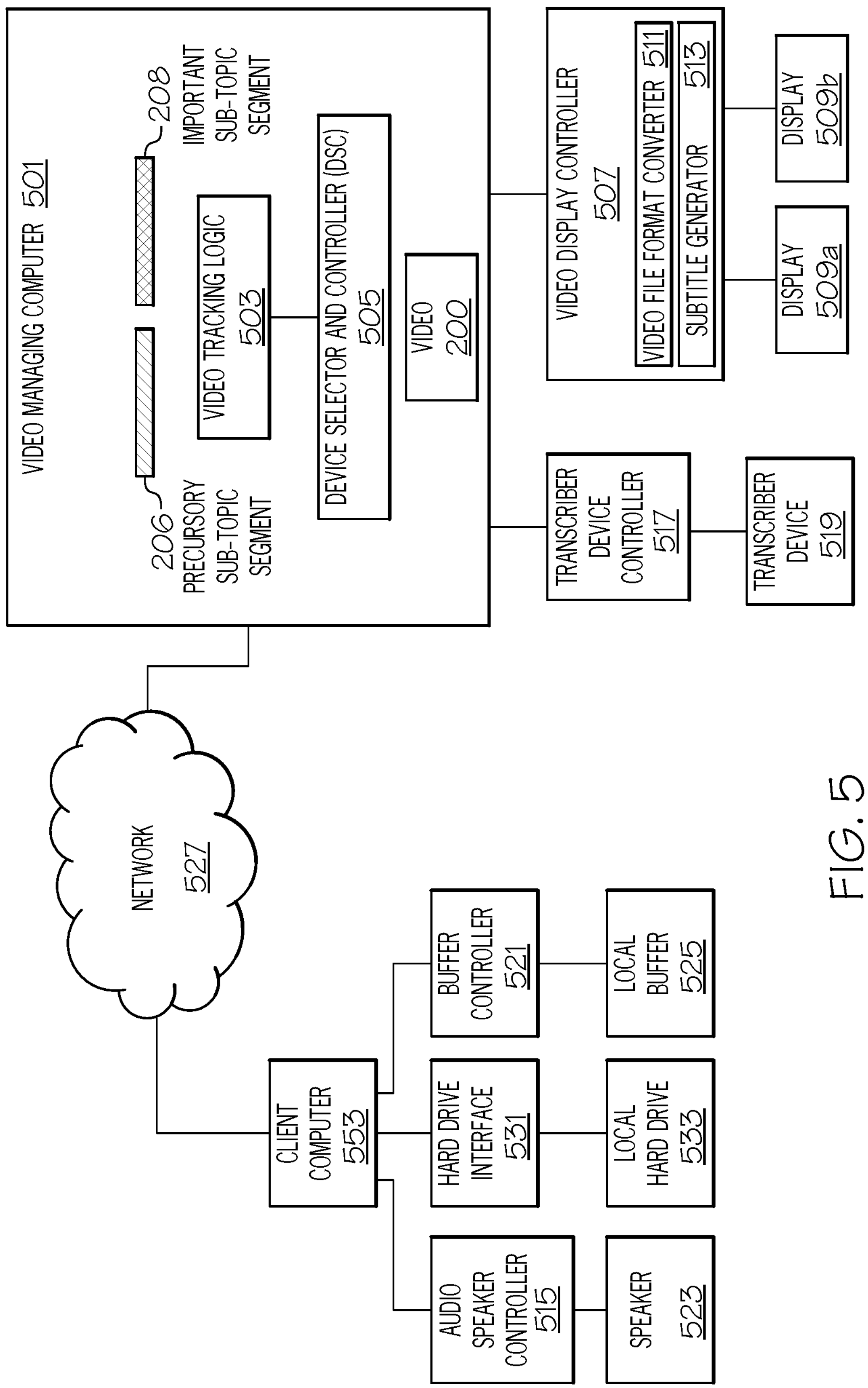
FIG. 5 illustrates another exemplary relationship between computers in accordance with one or more embodiments of the present invention.

FIG. 5 illustrates another exemplary relationship between computers in accordance with one or more embodiments of the present invention.

As depicted, a client computer 553 is in communication via a network 527 with a video managing computer 501 Video managing computer 501 includes video tracking logic 503 and a copy of heat map 210 and heat map 212. Video tracking logic 503 is configured to know whether or not precursory sub-topic segment 206 and/or important sub-topic segment 208 have been reached by a current entity using the video 200. In some embodiments, client computer 553 and network 527 are analogous (respectively) to client computer 153 and network 127 shown in FIG. 1, and video managing computer 501 is analogous to video managing computer 401 shown in FIG. 4.

Referring again to FIG. 5, video managing computer 501 also includes a device selector and controller (DSC) 505 that enables the selection and control of one or more devices to be used to manipulate the video 200, a copy of which is accessible to the video managing computer 501. For example, as depicted, video managing computer 501 can be operably coupled to video display controller 507, (analogous to video display controller 107 shown in FIG. 1). Video display controller 507 may have multiple capabilities. By way of further example, video display controller 507 may include a video file format converter 511, which may convert the format of the video 200 from one format to another format. For example, assume that a current entity that is using/viewing the video 200 has access to display 509*a* (e.g., a computer monitor) that is optimized to use video files in a MPEG v4 (.MP4) format, and display 509*b* (e.g., a virtual reality (VR) headset) that is optimized for video segments/files in a .AVI format. With reference now also to FIG. 2, assume further that video 200 is in .MP4 format, and thus the computer monitor (509*a*) is the best display to be used. However, assume now that video segments in the important sub-topic segment 208 are better viewed using a virtual reality (VR) headset, based on heat map 210 showing that previous entities have used VR headsets to view the important sub-topic segment 208. In such a case, video file format converter 511 may convert the important sub-topic segment 208 from .MP4 format to the .AVI format for use by the current entity that is using/viewing the video 200. In some embodiments, one or more of displays 509*a*-509*b* are connected to video managing computer 501 via network 527 and client computer 553.

As depicted in FIG. 5, video display controller 507 also includes a subtitle generator 513. As such and based on the activities shown in heat map 210, if previous viewers of video 200 added subtitles to a particular sub-topic segment (e.g., important sub-topic segment 208), then when video display controller 507 detects that precursory sub-topic segment 206 has been reached by a current viewer of the video 200, the subtitle generator 513 will perform audio-to-text conversion on the audio portion of the important sub-topic segment 208, and will display this generated text as subtitles on the display of the important sub-topic segment 208. That is, the important sub-topic segment 208, which may be difficult to learn by just listening to the lecturer in the video 200, will be provided with subtitles for the important sub-topic segment 208, thus making the information presented within the important sub-topic segment 208 more clear.

Referring again to FIG. 5, video managing computer 501 may also be operably coupled to transcriber device controller 517 and a transcriber device 519, which is under the control of the transcriber device controller 517. For example, it may be determined that a current viewer of video 200 may benefit from having a transcript of important sub-topic segment 208, which can be retrieved at the viewer's discretion for later study. In other words, in this example, the text created from the audio portion of the video 200 is not overlaid as subtitles to the video 200, but rather a retrievable text file is generated by a transcriber device 519, which is under the control of a transcriber device controller 517. That is, DSC 505 (based on the activities shown in the heat map 210) will instruct the transcriber device controller 517 to activate the transcriber device 519 to generate a transcript of the audio portion of the important sub-topic segment 208, which the current user can retrieve and read at a later date.

Some embodiments modify an aural component of multimedia content, e.g., based on heat map 210 information and through the use of audio speaker controller 515 and speaker 523 that provides the audio portion of the multimedia presentation. For example, assume that heat map 210 shows that previous viewers of the video 200 always turned up the volume on the speaker being used to view/hear the video 200. This may be due to a drop in the speech level of the presenter in the video 200. Thus, the audio speaker controller 515 may turn up the volume for speaker 523 whenever the important sub-topic segment 208 is playing.

In one or more embodiments of the present invention, information found in the heat map 210 is used to locally store a segment (e.g., important sub-topic segment 208) of the video 200 on the client computer 553. For example, assume that the heat map shows that previous viewers of the video re-watch important sub-topic segment 208. As such, a conclusion is drawn that the information in important sub-topic segment 208 is either important or difficult to understand or is otherwise important to the current viewer (whose first part of his/her heat map 212 matches the first part of the heat map of previous entities' actions/responses when watching the video 200). As such, the video managing computer 501 will direct a hard drive interface 531 to store the important sub-topic segment 208 on a local hard drive 533 (i.e., that is part of client computer 553), thus making this information readily available to the current user who is watching the video 200 on his/her client computer 553.

In one or more embodiments of the present invention, the important sub-topic segment 208 is retrieved before the current viewer reaches the important sub-topic segment 208, in order to buffer the important sub-topic segment 208 in a local buffer 525 (which is controlled by buffer controller 521) in the client computer 553. That is, once the video managing computer 501 recognizes that the sub-topic segment 208 is important (for exams, or is difficult to understand, etc.), then the important sub-topic segment 208 will be pre-loaded into the local buffer 525, such that there is no jitter or other degradation of the important sub-topic segment 208 when displayed at the client computer 553.

Thus, some embodiments include features, that may improve the functionality of a client computer 553 by displaying video 200 in a way that is 1) faster (e.g., due to buffering), 2) clearer (e.g., due to buffering), 3) easier to understand (e.g., from subtitle generation, audio control, etc.) and 4) presenting varied versions (e.g., in a different format for a different device, etc.).

Figure 6:
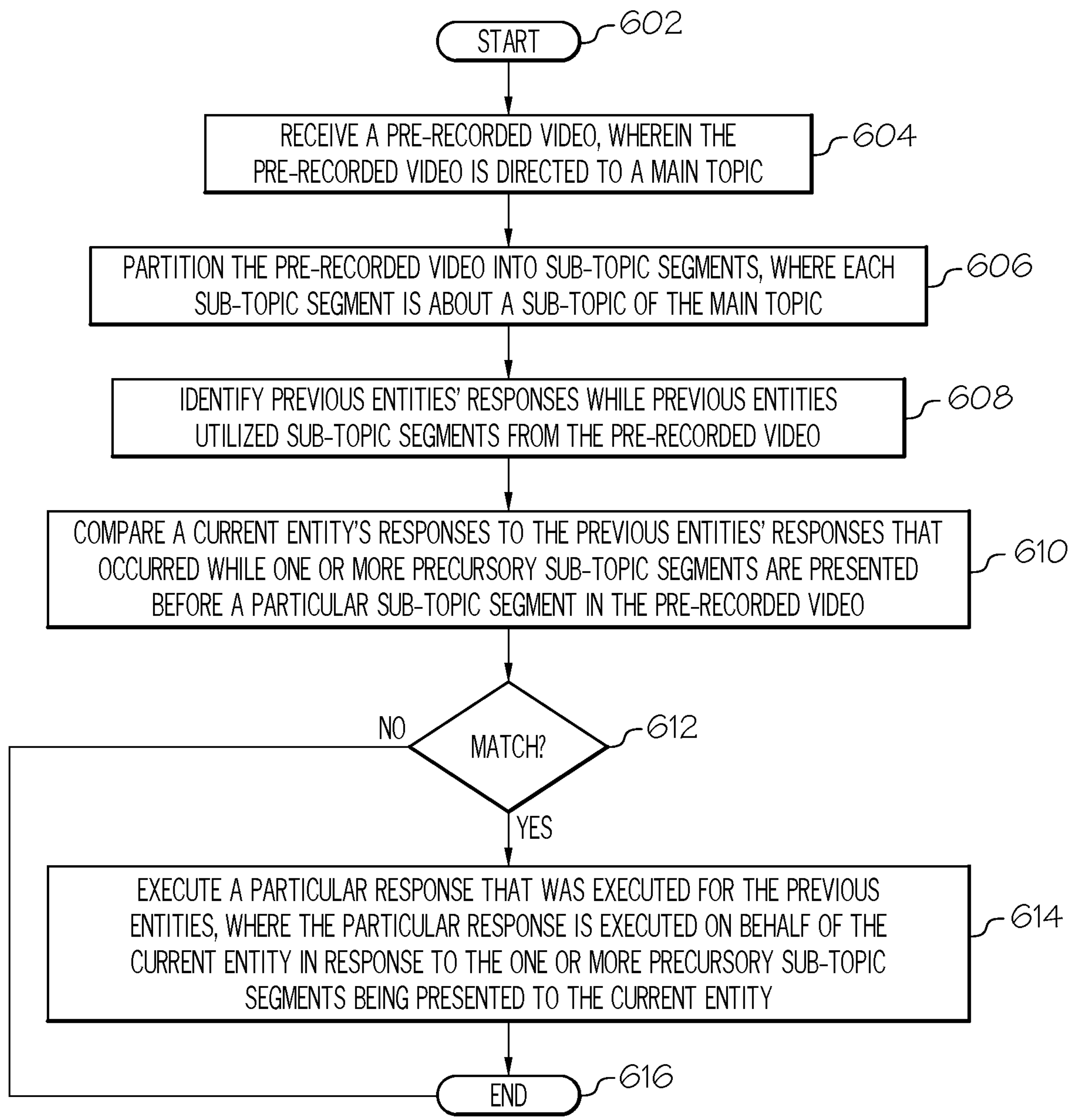
FIG. 6 depicts an exemplary method in accordance with one or more embodiments of the present invention.

FIG. 6 depicts an exemplary method in accordance with one or more embodiments of the present invention. As depicted, after initiator block 602, one or more processors (e.g., within video managing computer 501 shown in FIG. 5) receive a pre-recorded video (e.g., video 200), which is directed to a main topic (e.g., for a classroom lecture), in block 604.

In block 606, one or more processors partition the pre-recorded video into multiple sub-topic segments, where each sub-topic segment is about a sub-topic of the main topic. For example, the main topic may be about chemistry, and sub-topics may be about different elements from the periodic table.

In block 608, one or more processors identify previous entities' responses while previous entities utilized sub-topic segments from the pre-recorded video (as represented on heat map 210).

By way of a few (non-limiting) examples, the previous entities' responses may indicate that previous entities: paused the pre-recorded video at the particular sub-topic segment; rewound the pre-recorded video at the particular passage; and/or replayed the pre-recorded video at the particular passage, etc. In some embodiments, if previous viewers of sub-topic segment 208 paused, rewound, re-watched, etc. an identified segment, such a segment may be deemed to be important and one or more actions (e.g., buffering, storing, transcribing, etc.) are performed on that important sub-topic segment 208. As will be discussed in more detail below, in some embodiments, such actions may be considered a particular response to be (re)executed on behalf of a current viewing entity.

In block 610, one or more processors compare a current entity's responses to the previous entities' responses that occurred while one or more precursory sub-topic segments are presented before a particular sub-topic segment in the pre-recorded video (i.e., heat map 212 is compared to the first portion of heat map 210).

In decision block 612, it is determined whether the responses compared in block 610 match. If the responses match, e.g., the heat map 212 matches the first part of the heat map 210, the process proceeds to block 614. In block 614, one or more processors execute a particular response that was executed for the previous entities. The particular response can be executed on behalf of the current entity in response to the one or more precursory sub-topic segments being presented to the current entity. For example, with reference now also to FIG. 2, when the current user reaches precursory sub-topic segment 206 when watching video 200, then some type of action is performed based on the upcoming important sub-topic segment 208 for the benefit of the present viewer of the video 200.

A few (non-limiting) examples of particular responses follow.

Figure 3:
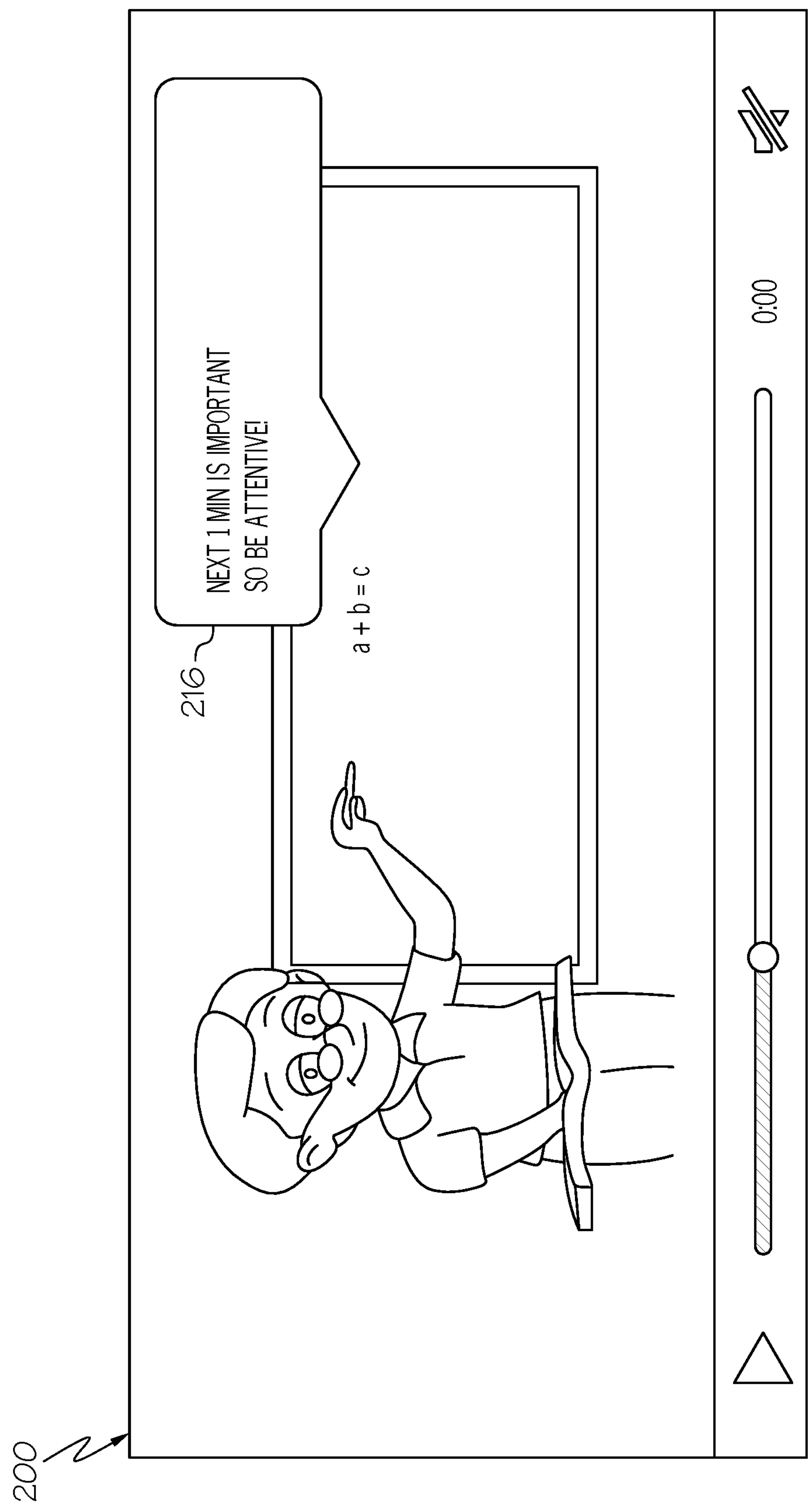
FIG. 3 depicts an exemplary video segment in accordance with one or more embodiments of the present invention.

In some embodiments of the present invention, the particular response (performed on behalf of the current viewer) is to overlay an alert over the pre-recorded video in response to one or more of the precursory sub-topic segments being presented to the current entity. For example and as shown in FIG. 3, this alert may simply say "The next passage may be on the exam so pay attention" or "The next passage is hard to understand, so pay attention", etc. Thus, the alert describes a feature (will be on a test, is hard to understand, etc.) of the particular sub-topic segment.

In some embodiments, the particular response is to convert the particular sub-topic segment from a first format to a second format. For example and as described in FIG. 5, the important sub-topic segment 208 may be converted from .MP4 to .AVI in order to allow the user to watch it on VR goggles.

In some embodiments, the particular response is to modify a size of a visual display of the particular sub-topic segment. For example, the information shown in important sub-topic segment 208 may be enlarged, zoomed in on, etc.

In some embodiments, the particular response is to modify an aural projection of the particular sub-topic segment. That is, the sound is automatically turned up when the current viewer watches the important sub-topic segment 208.

In some embodiments, the particular response is to pre-retrieve and buffer the particular sub-topic segment in response to reaching the precursory sub-topic segment, in order to avoid jittering and other problems that may occur if waiting for the important sub-topic segment 208 to stream to the client computer 553 shown in FIG. 5.

In some embodiments of the present invention, the particular response is to store the particular sub-topic segment in a local storage device as the particular sub-topic segment is being presented. This allows the user to have his/her own copy of the important sub-topic segment 208, without having to scroll through the video 200.

In some embodiments, the particular response is to send an audio portion of the particular sub-topic segment to a transcriber device for transcribing the audio portion into written text. This gives the user access to a written copy of the audio portion of the important sub-topic segment 208.

In some embodiments, the particular response is to modify a color of a visual display of the particular sub-topic segment. For example, in order to emphasize that sub-topic segment 208 is important, it may be shaded red.

In some embodiments, the particular response generates and displays subtitles for the particular sub-topic segment.

The method ends at terminator block 616.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
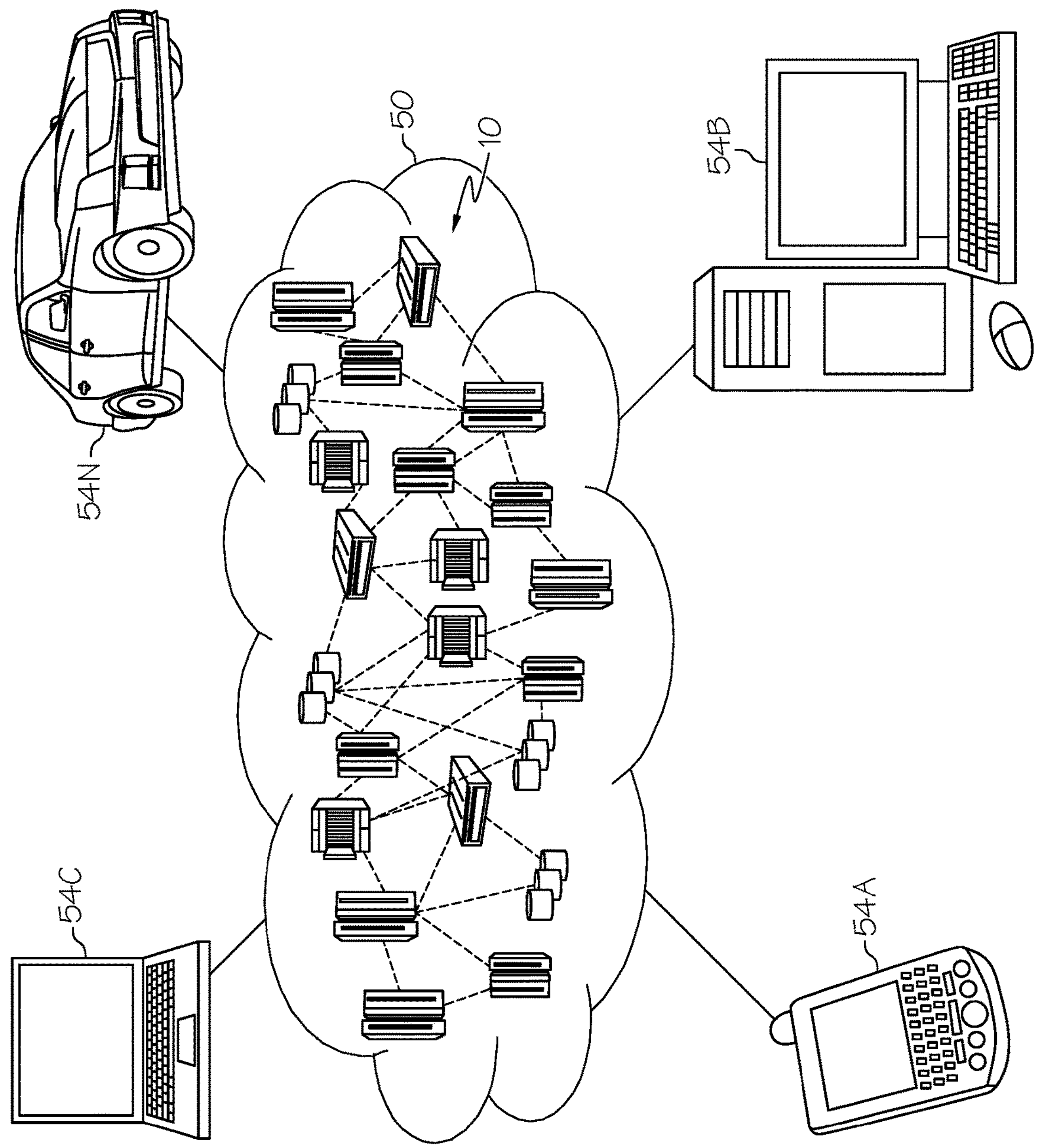
FIG. 7 depicts a cloud computing environment in accordance with one or more embodiments of the present invention.

Referring now to FIG. 7, illustrative cloud computing environment 50 is depicted. As shown, cloud computing environment 50 comprises one or more cloud computing nodes 10 (such as computer 101) may communicate with local computing devices, such as, for example, personal digital assistant (PDA) or cellular telephone 54A, desktop computer 54B, laptop computer 54C, and/or automobile computer system 54N used by cloud consumers. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
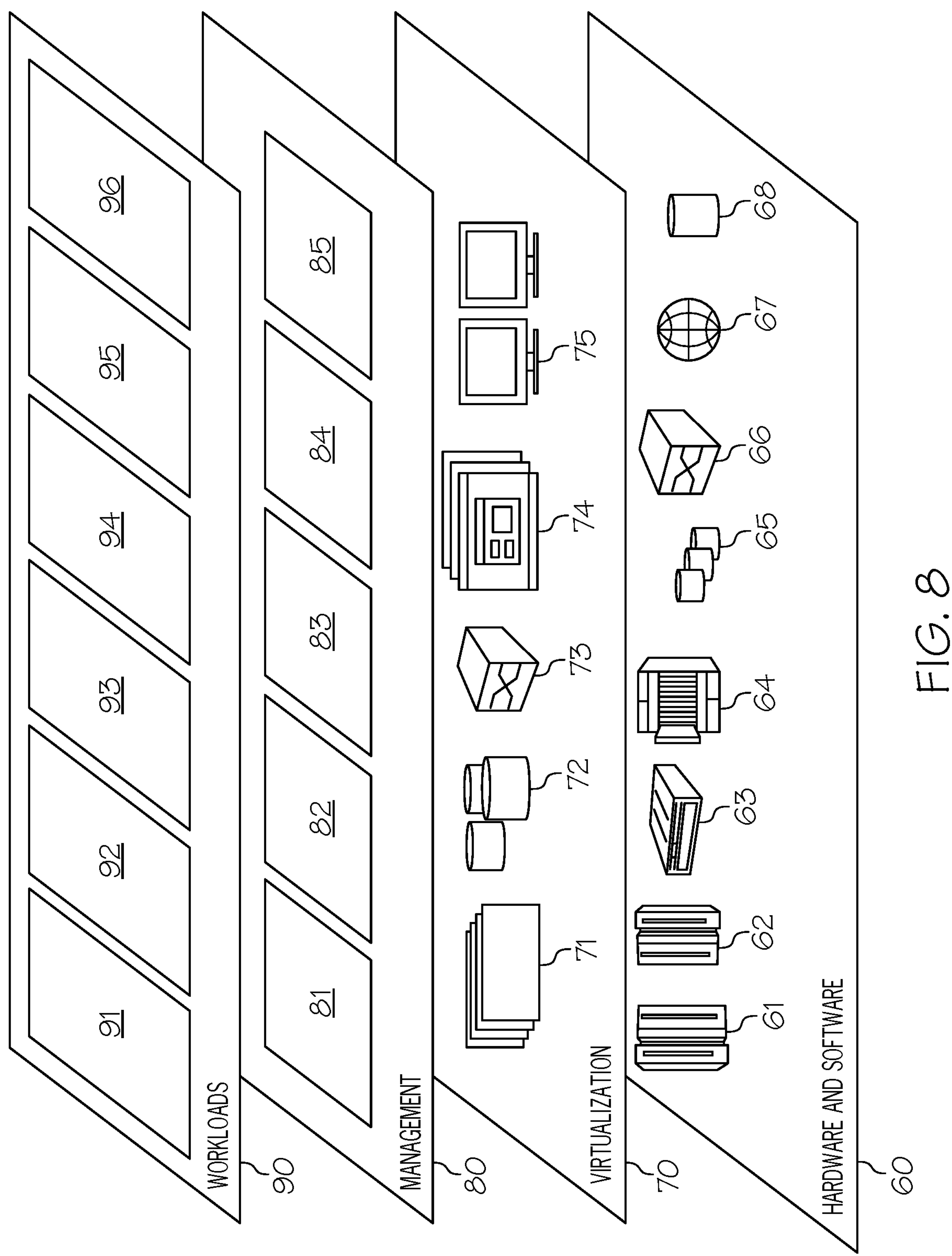
FIG. 8 depicts abstraction model layers of a cloud computing environment in accordance with one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multimedia content look-ahead processing 96, in accordance with one or more embodiments of the present invention.

The terminology used herein is for the purpose of describing particular embodiments only and is not intended to be limiting of the present invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:

receiving, by one or more processors, a pre-recorded video, wherein the pre-recorded video is directed to a main topic;

partitioning, by one or more processors, the pre-recorded video into sub-topic segments, wherein each sub-topic segment is about a sub-topic of the main topic;

identifying, by one or more processors, previous entities' responses while previous entities viewed precursory sub-topic segments from the pre-recorded video, wherein the precursory sub-topic segments were presented before an upcoming sub-topic segment;

receiving, by one or more processors, a current entity's responses that occurred while a current entity viewed one or more of the precursory sub-topic segments from the pre-recorded video;

comparing, by one or more processors, the current entity's responses to the previous entities' responses; and in response to the current entity's responses matching the previous entities' responses, overlaying, by one or more processors, an alert over the pre-recorded video advising the current entity that the upcoming sub-topic segment will be difficult to understand.

2. The computer-implemented method of claim 1, further comprising:

converting, by one or more processors, the upcoming sub-topic segment from a first format to a second format, wherein the first format is for a computer monitor, and wherein the second format is for a virtual reality headset; and displaying, by one or more processors, the upcoming sub-topic segment on virtual reality (VR) goggles using the second format.

3. The computer-implemented method of claim 1, further comprising:

in response to the current entity's responses matching the previous entities' responses, modifying, by one or more processors, an aural projection of the upcoming sub-topic segment.

4. The computer-implemented method of claim 1, further comprising:

in response to the current entity's responses matching the previous entities' responses, pre-retrieving and buffering, by one or more processors, the upcoming sub-topic segment in response to reaching one or more of the precursory sub-topic segments.

5. The computer-implemented method of claim 1, wherein the previous entities' responses comprise the previous entities pausing the pre-recorded video at the upcoming sub-topic segment.

6. The computer-implemented method of claim 1, wherein the previous entities' responses comprise the previous entities repeating the pre-recorded video at the upcoming sub-topic segment.

7. A computer program product comprising a computer readable storage medium having program code embodied therewith, wherein the computer readable storage medium is not a transitory signal per se, and wherein the program code is readable and executable by a processor to perform a method comprising:

receiving a pre-recorded video, wherein the pre-recorded video is directed to a main topic;

partitioning the pre-recorded video into sub-topic segments, wherein each sub-topic segment is about a sub-topic of the main topic;

identifying previous entities' responses while previous entities viewed precursory sub-topic segments from the pre-recorded video, wherein the precursory sub-topic segments were presented before an upcoming sub-topic segment;

receiving a current entity's responses that occurred while a current entity viewed one or more of the precursory sub-topic segments from the pre-recorded video;

comparing the current entity's responses to the previous entities' responses; and in response to the current entity's responses matching the previous entities' responses, overlaying an alert over the pre-recorded video advising the current entity that the upcoming sub-topic segment will be difficult to understand.

8. The computer program product of claim 7, wherein the method further comprises:

converting the upcoming sub-topic segment from a first format to a second format, wherein the first format is for a computer monitor, and wherein the second format is for a virtual reality headset; and displaying the upcoming sub-topic segment on virtual reality (VR) goggles using the second format.

9. The computer program product of claim 7, wherein the method further comprises:

in response to the current entity's responses matching the previous entities' responses, modifying, by one or more processors, an aural projection of the upcoming sub-topic segment.

10. The computer program product of claim 7, wherein the method further comprises:

in response to the current entity's responses matching the previous entities' responses, pre-retrieving and buffering, by one or more processors, the upcoming sub-topic segment in response to reaching one or more of the precursory sub-topic segments.

11. The computer program product of claim 7, wherein the previous entities' responses comprise the previous entities pausing the pre-recorded video at the upcoming sub-topic segment.

12. The computer program product of claim 7, wherein the previous entities' responses comprise the previous entities repeating the pre-recorded video at the upcoming sub-topic segment.

13. The computer program product of claim 7, wherein the program instructions are executed as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

receiving a pre-recorded video, wherein the pre-recorded video is directed to a main topic;

partitioning the pre-recorded video into sub-topic segments, wherein each sub-topic segment is about a sub-topic of the main topic;

identifying previous entities' responses while previous entities viewed precursory sub-topic segments from the pre-recorded video, wherein the precursory sub-topic segments were presented before an upcoming sub-topic segment;

receiving a current entity's responses that occurred while a current entity viewed one or more of the precursory sub-topic segments from the pre-recorded video;

comparing the current entity's responses to the previous entities' responses; and in response to the current entity's responses matching the previous entities' responses, overlaying an alert over the pre-recorded video advising the current entity that the upcoming sub-topic segment will be difficult to understand.

15. The computer system of claim 14, wherein the method further comprises:

converting the upcoming sub-topic segment from a first format to a second format, wherein the first format is for a computer monitor, and wherein the second format is for a virtual reality headset; and displaying the upcoming sub-topic segment on virtual reality (VR) goggles using the second format.

16. The computer system of claim 14, wherein the method further comprises:

in response to the current entity's responses matching the previous entities' responses, modifying, by one or more processors, an aural projection of the upcoming sub-topic segment.

17. The computer system of claim 14, wherein the method further comprises:

in response to the current entity's responses matching the previous entities' responses, pre-retrieving and buffering, by one or more processors, the upcoming sub-topic segment in response to reaching one or more of the precursory sub-topic segments.

18. The computer system of claim 14, wherein the previous entities' responses comprise the previous entities pausing the pre-recorded video at the upcoming sub-topic segment.

19. The computer system of claim 14, wherein the previous entities' responses comprise the previous entities repeating the pre-recorded video at the upcoming sub-topic segment.

20. The computer system of claim 14, wherein the stored program instructions are executed as a service in a cloud environment.

* * * * *